Figure 3:
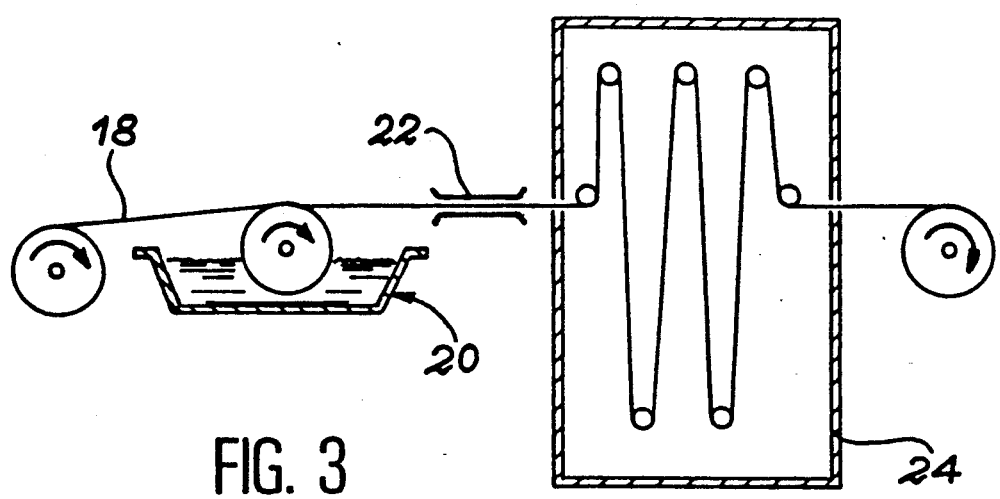

United States Patent [19]

Beziers et al.

[11] Patent Number: 5,189,093
[45] Date of Patent: Feb. 23, 1993

[54] BATCHING PROCESS FOR TREATMENT OF CARBON FIBERS

[75] Inventors: Daniel Beziers, St Medard en Jalles; Bernard Boutevin, Montpellier; Jean-Pierre Parisi, Montpellier; Yannig Thomas, Montpellier; Evelyne Chataignier, Merignac, all of France

[73] Assignee: Aerospatiale Societe Nationale Industrielle, France

[21] Appl. No.: 729,923

[22] Filed: Jul. 15, 1991

Related U.S. Application Data

[62] Division of Ser. No. 516,106, Apr. 27, 1990, abandoned.

[30] Foreign Application Priority Data

Apr. 27, 1989 [FR] France .................. 89 05598

[51] Int. Cl.$^5$ .................. C08J 5/06; C08K 3/04; C08L 33/00
[52] U.S. Cl. .................................................. 524/847
[58] Field of Search .............. 526/262, 271, 312, 320; 524/847

[56] References Cited

U.S. PATENT DOCUMENTS

| 4,659,795 | 4/1989 | Tsutsui et al. | 526/312 |
| 4,822,870 | 4/1989 | Restaino | 526/262 |
| 4,900,809 | 2/1990 | Tazi et al. | 526/271 |

FOREIGN PATENT DOCUMENTS 0256852 8/1988 European Pat. Off.

Primary Examiner—Paul R. Michl
Assistant Examiner—U. K. Rajguru
Attorney, Agent, or Firm—Hayes, Soloway, Hennessey & Hage

[57] ABSTRACT

According to the invention, the reactive lubricating product of carbon fibres for embedding in a resin which can be hardened by X or beta radiation according to a radical mechanism is constituted by a monomer having at least one functional group ($F_1$) able to form a covalent chemical bond with the hydroxyl sites of the carbon fibres and an ethylene unsaturation ($F_2$) able to crosslink with the resin during its hardening under irradiation.

6 Claims, 2 Drawing Sheets

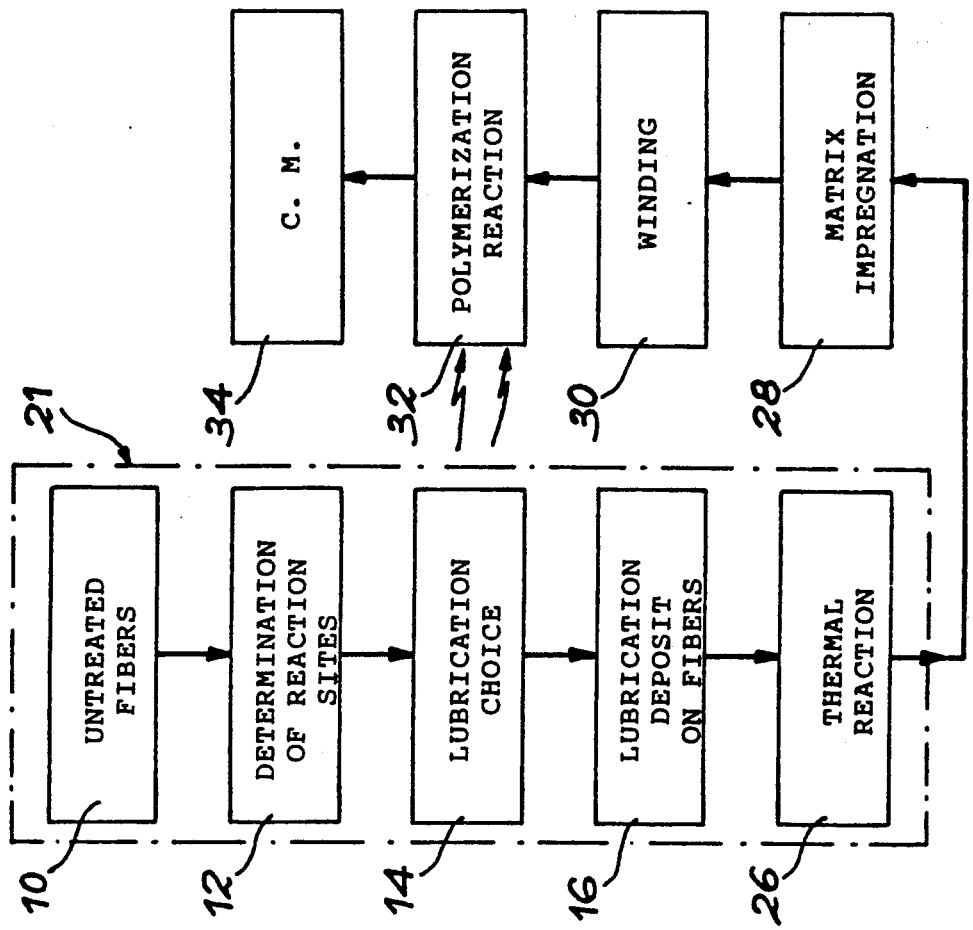
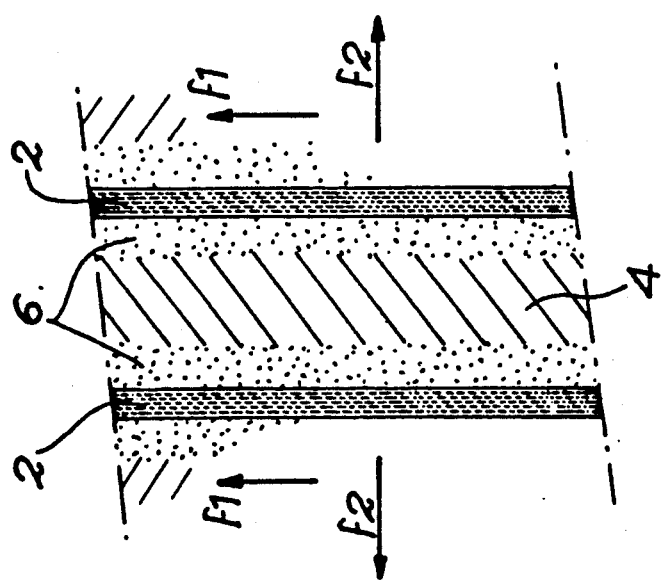
FIG. 2
FIG. 1

BATCHING PROCESS FOR TREATMENT OF CARBON FIBERS

This is a divisional of copending application Ser. No. 07/516,106 filed on Apr. 27, 1990, now abandoned.

DESCRIPTION

The present invention relates to a product for lubricating carbon fibres for embedding in a resin hardenable by radiation in accordance with a radical mechanism, which serves as an interface between the fibres and the resin of a composite material. It also relates to a process for producing a composite material having lubricated fibres, as well as to the material obtained.

The composite materials can be of a simple or complex nature and are in particular used in the motor vehicle, aeronautical, space, navigation and similar fields. In the aeronautical and space field, they are more particularly used for producing engines, floor plates and leading edges of aircraft.

FIG. 1 diagrammatically shows a simple structure composite material. Said composite material has carbon fibres 2 embedded in a matrix 4 constituted by a polymerized and/or crosslinked resin. It is also possible to see the interfaces 6 between the fibres 2 and the matrix 4.

In such a composite material there are two mechanical stressing types, one being longitudinal and corresponding to the direction of the fibres, as represented by arrows f1, whilst the other is transverse and perpendicular to the fibres and is represented by arrows f2. Transverse stresses are those of the shear and/or compressive type.

These stresses have repercussions at the fibre-matrix interfaces 6 and in the case where the latter constitute the weak point of the composite material, the mechanical performance characteristics obtained are lower than those of the matrix. In addition, when said composite materials are subject to shear stresses, there is generally a delamination between the fibres and the matrix, which can lead to the fracture of the material. The same applies with regards to complex structure composite materials, which essentially differ by the presence of metal inserts or objects.

In order to obviate these disadvantages, a certain number of interface products deposited on the carbon fibre have been envisaged and which are called lubricating or sizing products for the purpose of facilitating the impregnation conditions of the fibres by the resin during the production of the composite material and with a view to obtaining a "fastening" between the matrix and the fibres.

The known lubricating materials are generally complex copolymers or polymers leading to often long and tedious lubricating processes. Polymeric lubricating materials are in particular described in FR-A-2 129 905, FR-A-2 129 906, FR-A-2 558 842 and FR-A-2 483 395.

More specifically, the present invention relates to a product for lubricating carbon fibres for embedding in a resin which, according to a radical mechanism, can be hardened by radiation not causing any temperature rise in the material, such as X or beta radiation. Thus, the composite materials produced from resins which are polymerized and/or crosslinked by cold ionizing rays, according to a radical mechanism, have under certain stresses, mechanical performance characteristics equal or superior to those polymerized by the thermal procedure. The production of high performance composite materials with a simple or complex structure and using X or beta radiation has in particular been described in FR-A-2 564 029. However, the presently known lubricating materials are not compatible with a process for hardening resin by ionizing rays, according to a radical mechanism, and they then lead to inadequate interface bonds in the case of severe transverse stresses.

Thus, the most widely used high performance or structural composite materials (mechanical properties) are obtained by thermal polymerization and/or crosslinking in the presence or absence of a hardener, cf. the aforementioned documents.

The resins used are then epoxy resins or polyesters and the fibres are carbon or aramide glass fibres, whereof the surface preparation or lubricating material is compatible with the thermal process used for hardening these resins.

Reference can be made in this connection to U.S. Pat. No. 3,398,210, which refers to the lubricating of glass fibres for embedding in a polyester resin with ethylene unsaturations and which can be hardened thermally or by irradiation. The fastening or attachment of the lubricating product to the fibres is ensured by physical bonds of the hydrogen type between silanol groups Si-OH of the fibres and those of the lubricating products, which are products obtained by the hydrolysis of silane derivatives.

Reference can also be made to WO-A-85/04200 concerning the preparation of cellulose fibres for embedding in a thermally hardenable, unsaturated or non-unsaturated resin. The coating of the fibres by this preparation is followed by a hot alkaline treatment. This takes a long time, is tedious and relatively complex.

Reference can also be made to EP-A-256 852 concerning the lubricating of carbon fibres by a dimethacrylate-urethane product and which are to be embedded in a thermally hardenable, unsaturated resin.

The attachment of the lubricating product to the fibres is brought about solely by physical bonds, the polar urethane functions having affinities with the reaction sites of the fibres.

The invention also aims at improving the transverse stress characteristics of a carbon fibre composite material, whereof the matrix is obtained by polymerizing a resin under radiation, according to a radical mechanism, so as to have identical performance characteristics to the thermally polymerized composite material, with regards to the compression and shear strength. The improvement to these characteristics involves the use of a specific, radiation-sensitive lubricating product. In addition, lubrication must be relatively simple and industrially usable. The invention more specifically relates to a reactive carbon fibre lubricating product having OH reaction sites and for embedding in a resin cold hardenable by radiation in accordance with a radical mechanism and constituted by a monomer having at least one functional group able to thermally form covalent chemical bonds with these reaction sites and at least one second functional group differing from the first and able to form covalent chemical bonds with said resin during its hardening under said radiation, the first group being chosen from among isocyanate, carboxylic acid anhydride, methylol and carboxylic acid chloride groups.

The term lubricating is understood to mean the operation consisting of coating the non-surface treated fibres with an accurately metered material quantity. Generally, this quantity represents 0.3 to 1.5% by weight and preferably 0.3 to 0.9% by weight of the fibres.

The bifunctional lubricating product according to the invention makes it possible to ensure a "windability" of the fibres at the time of impregnation by the resin, as well as a good interface quality between the fibre and the matrix (in order to have a good resistance to transverse stresses). The term "windability" is understood to mean that the fibre retains its shape and does not undergo fibre separation.

The first functional group $F_1$ of the lubricating product according to the invention ensures a covalent chemical bond between the chemical reaction sites of the fibres and the lubricating product.

The reaction sites of the fibres are dependent on the nature of the latter, as well as the heat treatments performed on them during their production. Thus, the reaction sites of the presently known carbon fibres are OH, $CO_2H$,

with R and R'=H or an alkyl, aryl or phenyl group.

The invention solely relates to carbon fibres having mainly OH sites as the reaction sites.

The first functional groups of the lubricating material according to the invention have the advantage of thermally forming chemical bonds with the OH sites, at temperatures which do not trigger a homopolymerization chemical reaction of the second group of the lubricating product. The choice of the reaction sites present in a larger quantity on the fibres is aimed at improving the attachment of the resin matrix to the fibres.

The functional groups of the carboxylic acid anhydride type can result from a mono-di or tri-carboxylic acid. Preferably, the isocyanate function is used for the first group. Under these conditions, the covalent chemical bond established with the OH sites of the fibres is a urethane bond.

The second functional group $F_2$ of the lubricating product according to the invention favours the connection between said interface product and the resin of the composite material matrix. This connection or bond is a covalent chemical bond and is ensured during the cold polymerization and/or crosslinking of the resin of the composite material under radiation according to a radical mechanism. In particular, the second functional group must be able to copolymerize, according to a radical mechanism, with the resin of the matrix during its hardening and under beta or X radiation. The second functional group must also be of the same nature as that constituting the resin of the composite material.

In order to obtain high performance composite materials, preference is given to the use of resins with ethylene unsaturations such as epoxy, polyester or polyurethane resins with (meth)acrylic terminations or mixtures of these resins. It should be noted that epoxy resins with ethylene unsaturations are resins having an epoxy origin having no longer any epoxy function. Moreover, the $F_2$ group of the lubricating product according to the invention is advantageously chosen without ethylene unsaturations. However, it is possible to use $F_2$ groups of the maleimide type for resins of the bismaleimide type. In particular, said second group $F_2$ is of formula (I)

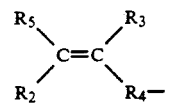

in which $R_5$ represents a hydrogen atom, a benzene nucleus,

and $R_2$ represents a hydrogen atom or

with $R_O$ representing a straight or branched aryl or alkyl radical having 1 to 12 carbon atoms, $R_3$ represents a hydrogen atom or the methyl radical and $R_4$ an aryl radical,

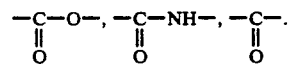

The aryl groups are in particular of the phenyl, naphthyl, etc. types.

The lubricating material according to the invention serves to improve the adhesion of the carbon fibres to the resin matrix of a composite material. The invention also relates to a composite material having carbon fibres embedded in a resin hardened by beta or X radiation according to a radical mechanism and having a reactive fibre lubricating product of the type defined hereinbefore. The invention also relates to a process for producing said composite material.

According to an essential feature of the said process, the latter comprises the following stages:
a) dissolving the aforementioned lubricating product in an organic solvent;
b) depositing the solution obtained in a) on the fibres;
c) heating the fibres obtained in b) in order to evaporate the solvent and solely trigger the chemical reaction between the first group and the reaction sites of the fibres;
d) impregnating the fibres obtained in c) with a resin hardenable by radiation according to a radical mechanism and
e) subjecting the impregnated resin fibres to said radiation in order to copolymerize the lubricating product with the resin via the second group and harden the said resin.

The functions $F_2$ compatible with matrixes hardenable by radiation are generally temperature-sensitive. Thus, stage c) of the process must be carried out at a temperature not permitting the homopolymerization of the lubricating product via the second functional group. It is also preferable to use as the organic solvent, solvents having a low vapour pressure or tension Pv and a low boiling point Te. In particular, the organic solvent must have a boiling point below 100° C. and a vapour tension above 95 mb (9.5 kPa) at 20° C.

For example, the solvent is constituted by dichloromethane Pv=45.3 kPa, Te=40° C.), chloroform (Pv=21 kPa, Te=60° C.), tetrahydrofuran (Pv=20 kPa, Te=66° C.), acetone (Pv=23.3 kPa, Te=56.5° C.), Dichloroethane (Pv=24 kPa, Te=83° C.), methyl ethyl ketone (Pv=10.5 kPa, Te=79.6° C.) or ethyl acetate (Pv=9.5 kPa, Te=77° C.).

Moreover, the temperature designated $T_1$ during stage c) is dependent on the reaction, designated $R_1$, between the OH reaction sites of the fibres and the functional group $F_1$ (and therefore the function $F_1$), as well as the reaction between the functional groups $F_2$ of the lubricating product.

For example, for a function $F_1$ of the isocyanate type and a function $F_2$ of the (meth)acrylate type ($CH_2=CY-CO_2-$ with $Y=H$ or $CH_3$), a reaction temperature $T_1$ of approximately 60° C. is used, bearing in mind that the (meth)acrylate function is very temperature-sensitive. Under these temperature conditions, the duration of stage c) will obviously be sufficiently long to ensure a sufficiently high reaction level $R_1$.

By only replacing the function $F_2$ (meth)acrylate by a cinnamate function ($Ph-CH=CH-CO_2-$) maleate function or fumarate function

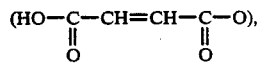

or by a styrene function ($CH_2=CH-Ph-$), with pH representing the phenyl radical, it is possible to increase the temperature $T_1$ to approximately 110° C. Under these conditions, at the end of stage c), the reaction level $R_1$ is higher in the case of the (meth)acrylate function on leaving the resin impregnation chain.

The other types of functions $F_1$ which can be used, whilst retaining the function $F_2$ (meth)acrylate are carboxylic acid anhydride, acid chloride and N-methylol.

In the same way, it is possible to combine these new functions $F_1$ by replacing the function $F_2$ (meth)acrylate by a cinnamate, maleate, fumarate or styrene function. In this case, the reaction temperature $T_1$ can be chosen between 60° and 110° C.

As the lubricating product having as the function $F_1$ an acid anhydride and as the function $F_2$ an ethylene unsaturation, reference can be made to maleic anhydride of formula

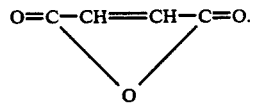

As the lubricating product having as the function $F_1$ an acid chloride and as the function $F_2$ an ethylene unsaturation, reference can be made to the cynnamoyl chloride of formula:

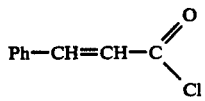

As the lubricating product having as the function $F_1$ a N-methylol and as the function $F_2$ an ethylene unsaturation, reference can be made to the N-methylol acrylamide of formula

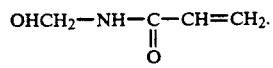

In order to favour and/or accelerate the chemical reaction $R_1$ between the reaction sites of the fibres and the first functional group to an even greater extent, it is possible to add a catalyst or a catalyst mixture to the solution containing the lubricating product. It is also possible to add to the lubricating product solution an inhibitor of the homopolymerization reaction between the functions $F_2$ of the lubricating product.

When the first functional group is the isocyanate group, the catalyst is constituted by DBTDL (dibutyl tin dilaurate) optionally associated with DABCO (1,4-diazobicyclo(2,2,2)-octane).

The lubricating product according to the invention e.g. has the following formula (II):

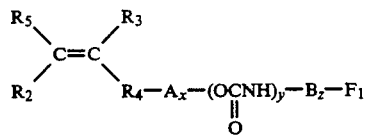

with x, y and z representing 0 or 1, $F_1$ representing $-N=C=O$, $-Cl$, $-CH_2OH$,

$R_5$, $R_2$, $R_3$ and $R_4$ having the same meanings as hereinbefore, A representing a straight or branched alkyl radical with 1 to 12 carbon atoms and B representing a straight or branched alkyl radical with 1 to 6 carbon atoms or an aryl radical of type:

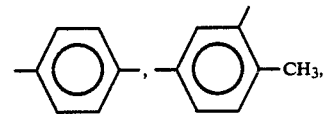

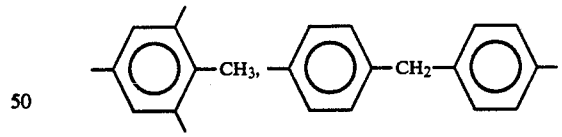

Other features and advantages of the invention can be gathered from the following description given in an illustrative and non-limitative manner with reference to the attached FIGS. 2 to 4, FIG. 1 having already been described.

Figure 4:
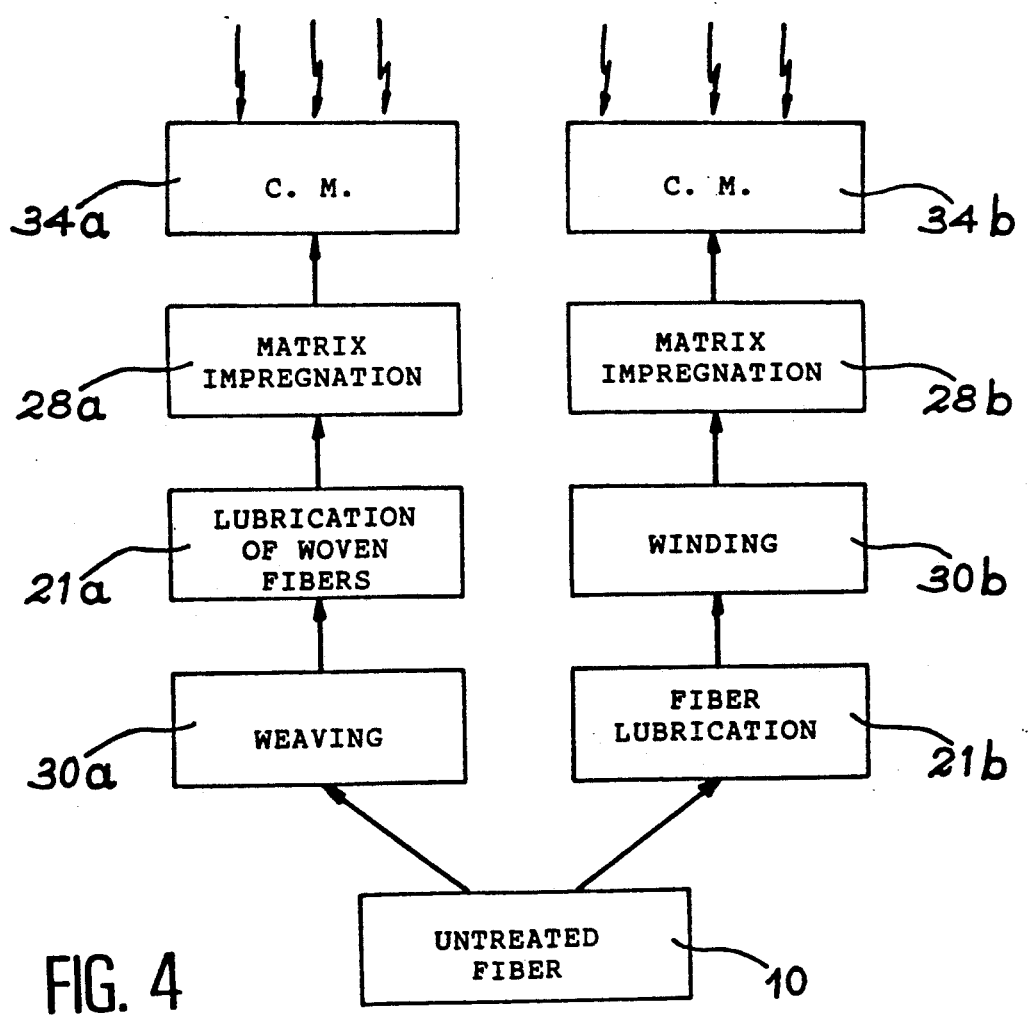

FIGS. 2 to 4 are block diagrams illustrating the process for producing a composite material from carbon fibres lubricated with the lubricating product according to the invention.

FIG. 3 diagrammatically represents the lubricating of a carbon fibre with the lubricating product according to the invention.

With reference to FIGS. 2 and 3, a description is given hereinafter of the production of a composite material part having fibres lubricated in accordance with the invention and embedded in a radiationhardened matrix. Lubrication is carried out on untreated carbon fibres, which have undergone no surface treatment. The use of untreated fibres is symbolized by block 10 in FIG. 2.

Firstly the surface state of the untreated fibres is investigated by the known electron spectroscopy ESCA. This stage is represented by block 12 in FIG. 2. It makes it possible to determine the reaction sites of the fibres. With a view to an optimum fastening of the lubricating product, the statistically most numerous reaction sites are chosen. In the case of carbon fibres of the intermediate modulus type, it is found that the preponderant reaction sites are hydroxyl groups.

This is followed by the determination of the choice of lubricating product, as symbolized by block 14 in FIG. 2. The chosen lubricating product is obviously a function of the reaction sites determined by the ESCA method, but also the resin type used for forming the matrix of the composite material. The lubricating products are as defined hereinbefore.

The chosen lubricating product is then dissolved in an organic solvent with a low vapour tension in proportions permitting a lubricating rate of 0.3 to 2%. The solvent is necessary for aiding the distribution and impregnation of the fibres by the lubricating product, taking account of the sought low final lubricating level percentage.

In order to optimize the reaction $R_1$ between the reaction sites of the fibres and the function $F_1$ of the lubricating product, it is possible to add to the lubricating solution one or more catalysts of the reaction $R_1$, as well as an inhibitor of the homopolymerization reaction between the functions $F_2$ of the lubricating product.

The following stage of the product represented by block 16 in FIG. 2 consists of depositing the lubricating solution obtained on the untreated fibres. As represented in FIG. 3, this deposition takes place by passing at constant speed each fibre 18 to be lubricated into a tank 20 containing the lubricating solution. After passing into a spinning nozzle 22, the lubricated fibre 18 enters an oven 24 raised to the maximum temperature $T_1$ allowed for the function $F_2$.

The passage of each fibre into oven 24 makes it possible to evaporate the solvent from the lubricating solution, as well as to trigger the chemical reaction $R_1$ between the function $F_1$ of the lubricating product and the reaction sites of the fibre. This stage is represented by block 26 in FIG. 2.

The temperature $T_1$ is chosen so as to aid the reaction $R_1$ without bringing about any reaction by homopolymerization of the function $F_2$ of the lubricating product to be fastened to the resin of the matrix.

The spinning nozzle 22 makes it possible to improve the lubricating product percentage on the fibres 18, as well as the core impregnation of the fibres by the lubricating product.

The stoving time of each impregnated fibre is dependent on the maximum temperature $T_1$ authorized by the function $F_2$, the travel speed of the fibre and the length of oven 24. For example, the travel speed is 24 m/min and the passage length in an oven 6 m.

The fibre lubricating process 21 is then finished. The thus lubricated fibres 18 can be stored for several days until a given composite material part is manufactured.

The lubricated fibres are then impregnated in an impregnation bath by a liquid resin of the urethane-acrylic, epoxy-acrylic or polyesteracrylic type, or a formulation obtained by mixing these different resins. This impregnation stage is performed in known manner and is symbolized by block 28 in FIG. 2.

The resin-impregnated, lubricated fibres are then deposited on a support of a mandrel type representing the shape of the composite material part to be produced, in accordance with previously calculated winding trajectories. Winding is carried out on several layers, so as to obtain optimum mechanical performance characteristics. This winding stage constitutes the production stage of the fibrous substrate of composite material and is symbolized by block 30 in FIG. 2. In place of winding the fibres, it is also possible to carry out weaving in two or three directions.

The final stage of the process symbolized by block 32 in FIG. 2 consists of polymerizing and/or crosslinking the resin of the matrix and reacting the function $F_2$ with the resin of the matrix by subjecting the substrate to ionizing X or beta radiation.

The irradiation conditions for a composite material part are dependent on its shape, as well as the nature of the resin constituting the matrix. These conditions are in particular as given in FR-A-2 564 029.

In the case of a cylindrical part, is exposed to the action under an electron or X-ray accelerator, which is moving and rotating in such a way that all the portions liable to be modified by the radiation receive the minimum dose necessary for the same. These structural modifications are obviously the copolymerization of the lubricating product with the resin of the matrix, as well as the hardening of said resin. Moreover, the composite material parts, particularly of the aircraft engine type, have adhesive portions for ensuring the various bonds and connections which must be hardened by radiation. The adhesive is generally based on an acrylic-epoxy resin.

For a composite material part produced with carbon fibres lubricated with a lubricating product, whose function $F_2$ is an ethylene unsaturation and impregnated with epoxy resin with an acrylic termination, use is made of an irradiation dose of 50 kGy for the polymerization of the resin of the matrix and the copolymerization of the function $F_2$ with the resin of the matrix.

Irradiation is ensured by X-rays or electrons, as a function of the thickness of the part in question.

In the case of a very reactive matrix resin requiring low radiation doses, e.g. approximately 10 kGy, it is necessary to choose as the minimum dose that necessary for ensuring the reaction $F_2$ if said dose exceeds that necessary for the hardening of the matrix.

The composite material (C.M.) part symbolized by the block 34 in FIG. 2 is then finished.

For the production of a composite material part, it is possible to reverse the stages of lubrication, producing the substrate and impregnating the fibrous substrate by the resin and this is represented in FIG. 4. In particular, it is possible to carry out a weaving 30a of the untreated fibres 10 (left-hand part of FIG. 4) prior to the lubrication thereof. The lubrication represented by block 21a is then carried out as previously.

The lubricated fibres are then impregnated by the liquid resin of the matrix, as symbolized by block 28a. The production of the composite material 34a continues by irradiating the lubricated, impregnated substrate.

It is also possible to carry out the lubrication of the fibres, represented by block 21b in the right-hand part of FIG. 4, just prior to the production of the fibrous substrate by weaving or winding, as represented by block 30b. The lubricated substrate can then be impregnated by the liquid resin of the matrix, as indicated by block 28b, followed by irradiation, in order to obtain the final composite material product 34b.

Various examples of lubricating products according to the invention will now be given.

EXAMPLE 1

This example relates to a product for lubricating carbon fibres having hydroxyl sites for embedding in an epoxy resin, polyester or polyurethane having (meth)acrylic terminations. The first functional group is an isocyanate group and the second function group a methacrylate.

The formulas of the compounds used for the production of said lubricating product, as well as the reaction diagram are given in appendix I.

OPERATING CONDITIONS

A dropwise addition takes place of 144 g (1 mole) of 2-hydroxypropyl methacrylate (III) to a solution containing 174 g of a mixture of 2,4 and 2,6-toluylene diisocyanate (80/20) (IV) and 0.3 g of dibutyl tin dilaurate (DBTDL) (catalyst of the alcohol-isocyanate reaction) in 300 g of anhydrous toluene, at a temperature of 60° C. and under dry nitrogen bubbling.

In order to prevent the polymerization of the double bond, 100 ppm of hydroquinone are added and stirring is continued and the temperature maintained at 60° C. for 5 hours. This is followed by the evaporation of the solvent with the Rotavapor under 2.7 kPa (20 mmHg) at ambient temperature (20° C.), followed by a vane pump at 67.5 Pa (0.5 mmHg) for a few minutes in order to eliminate all traces of solvent. This leads to compound (V) under majority conditions (90%), with 10% of dimethacrylate obtained by reacting 2 moles of (III) with (IV).

Access is obtained to the percentage of the isocyanate functions according to the traditional method of dosing NCO functions by dibutyl amine. This gives 12.8% in place of the theoretically calculated 13.4%.

CARRYING OUT LUBRICATION

In order to obtain a lubricating level close to 0.5% on the carbon fibre, a lubricating solution is prepared with 0.75 g of the mixture previously obtained and containing unsaturated isocyanate(V) in 100 g of dichloromethane, to which is added a mixture of catalysts in the following proportions: 0.15 g (DBTDL) of dibutyl tin dilaurate +0.22 g (DABCO) 1,4-diazobicyclo-(2,2,2)-octane for 1 mole of isocyanate (IV).

EXAMPLE 2

This example differs from example 1 by the choice of the starting products respectively having the isocyanate function and the methacrylate function. The formulas of the different compounds used for producing this product are given in appendix II.

OPERATING CONDITIONS

Dropwise addition takes place of 144 g (1 mole) of 2-hydroxypropyl methacrylate (VI) to a solution containing 168.2 g (1 mole) of hexamethylene diisocyanate (VII) and 0.3 g of DBTDL, as well as 100 ppm of hydroquinone (polymerization inhibitor) in 300 g of ethyl acetate at a temperature of 60° C. Stirring and the temperature are maintained at 40° C. for 5 hours. The solvent is evaporated with Rotavapor under 2.7 kPa (20 mmHg) at ambient temperature (20° C.). This gives compound (VIII) mixed with compound (IX). The dosing of the isocyanate functions gives 12.97%, the theoretical percentage being 13.46%.

The lubricating product is obtained in the same way as in example 1.

EXAMPLE 3

In this example the first group is once again an isocyanate group and the second group a maleate group. The products used for producing this lubricating product, as well as the reaction diagram are given in appendix III.

In the first stage 60 g (1 mole) of isopropanol (XI) are reacted with 98 g (1 mole) of maleic anhydride (X) at 100° C. for 2 hours and compound (XII) is obtained quantitatively.

In the second stage 100 g (1 mole) of epoxy hexane (XIII) are reacted with 0.1% by weight (based on all the reagents) of chromium diisopropyl salicylate (CrDIPS) (unsaturated epoxide-acid reaction catalyst), added to 158 g (1 mole) of (XII). The reaction takes place at 100° C. for 3 hours, which gives compound (XIV) with an 86% yield.

The third stage involves the dropwise addition of 258 g (1 mole) of (XIV) to a solution containing 174 g (1 mole) of 2,4-toluylene diisocyanate (TDI) (XV) in 2 liters of anhydrous hexane under a dry nitrogen stream at ambient temperature and accompanied by stirring. Bubbling is stopped after 7 hours, but stirring is allowed to continue for a further 17 hours, having ensured that no moisture can enter the reaction mixture.

The isocyanate-maleate compound (XVI) obtained forms a relatively viscous green oil, which is insoluble in hexane. It is thus extracted by the separation of two phases and is washed by hexane in order to eliminate the 2,4-TDI (XV), which has not reacted. The residual hexane is filtered on a frit. Compound (XVI) is recovered by solubilization in dichloromethane. Finally, compound (XVI) is obtained with a yield of 93.5%. The percentage of NCO functions is 9.55% in place of the theoretically calculated 9.72%.

Lubrication is the same as in example 1.

EXAMPLE 4

Preparation takes place of a lubricating solution containing 0.75 g of unsaturated isocyanate (V) obtained in example 1 in 100 g of dichloromethane. Using this solution HERCULES IM6 carbon fibres, whose majority reaction sites are hydroxyl groups, were lubricated. Lubrication took place in accordanc with the diagram of FIG. 3. The evaporation of the solvent and the reaction $R_1$ between the isocyanate function and the OH sites were carried out at 50° C. This heat treatment lasted 15 seconds (passage speed 24 m/min and passage length 6 m).

The lubricated carbon fibres were then impregnated in a liquid resin mixture containing acrylate-epoxy resin and an acrylate-polyurethane resin.

This was followed by the winding of a N.O.L. ring (characterization modulus) making it possible to define the interlaminar shear between the fibres and the matrix. This N.O.L. ring was then irradiated with electrons at a dose of 50 kGy. During irradiation, the characterization modulus underwent a rotation and a passage under the electron accelerator. The travel speed was 0.12 m/min for an electron accelerator of 6.2 MeV and 7.5 kW.

The interlaminar shear characterization was performed in flexion according to three points. This gave an interlaminar shear stress of approximately 40 MPa.

EXAMPLE 5

This example only differs from example 4 through the use of a lubricating product (VIII) obtained in example 2. The composition of the lubricating solution is the same as in example 4.

The interlaminar shear stress measured for untreated IM6 fibres lubricated by this lubricating product and embedded in a matrix identical to that of example 4 is between 45 and 50 MPa.

COMPARISON EXAMPLE 1

A HERCULES IM6 carbon fibre with a lubricant G (which corresponds to a fibre in its commercial form) was impregnated by a resin mixture constituted by an acrylate-epoxy resin and an acrylate-polyurethane resin identical to that of example 4. After producing a N.O.L. ring and polymerizing the resin under the same conditions as in example 4, the interlaminar shear stress of the N.O.L. ring was measured. The measured stress was between 20 and 30 MPa and is therefore below that obtained in examples 4 and 5 according to the invention.

COMPARATIVE EXAMPLE 2

An unlubricated HERCULES IM6 carbon fibre was impregnated with a resin mixture of acrylate-epoxy resin and acrylate-polyurethane as in example 4. After producing a N.O.L. ring and polymerizing said ring in accordance with example 4, the interlaminar shear stress of the ring was measured and found to be close to 30 MPa.

It is clear from examples 4 and 5 and comparative examples 1 and 2, that the use of a lubricating product according to the invention improves the transverse stress characteristics of composite materials.

Other lubricating products usable in the invention with OH group-rich carbon fibres and a resin with acrylic terminations, reference can be made to those given in appendix IV.

APPENDIX I
Isocyanate-methacrylate

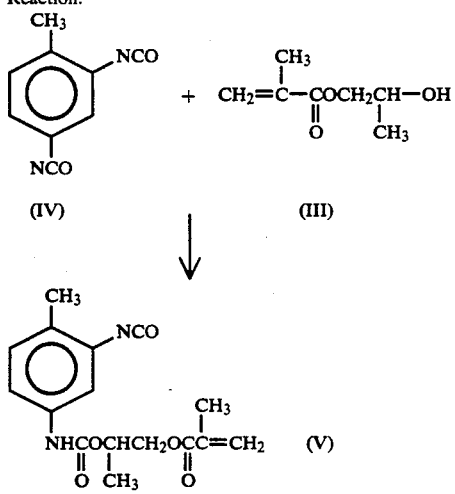

APPENDIX II
Isocyanate-methacrylate

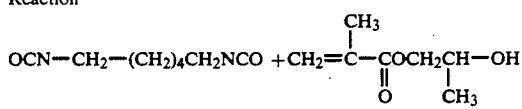

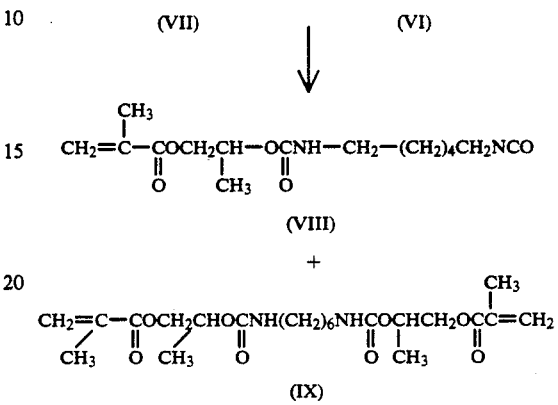

APPENDIX III
Isocyanate-maleate

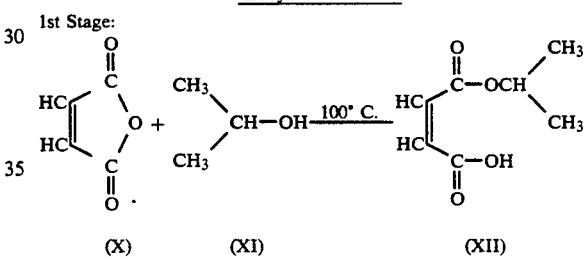

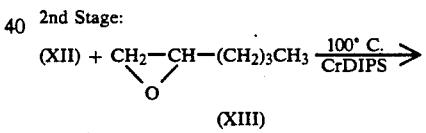

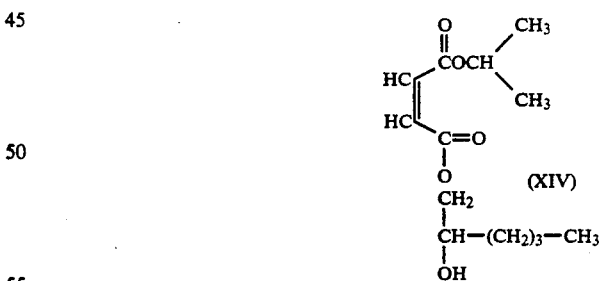

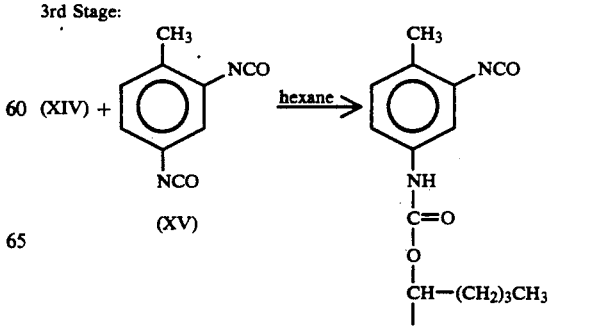

APPENDIX III
Isocyanate-maleate

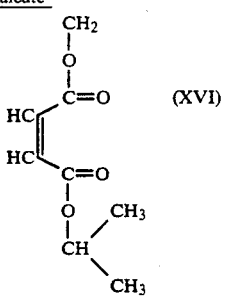

APPENDIX IV

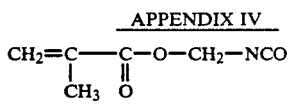

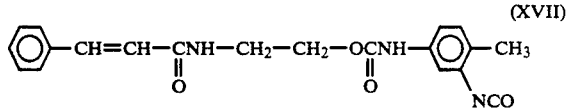

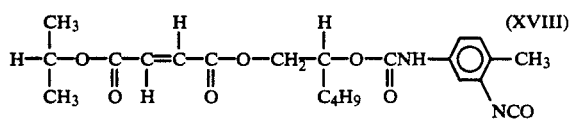

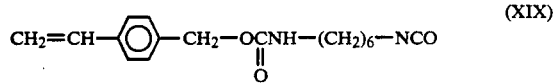

We claim:

1. A batching process for treatment of carbon fibers having OH reaction sites which are embedded in a resin hardenable by radiation according to a radical mechanism, said process comprising the steps in sequence of:

(a) dissolving in an organic solvent a reacting batching product comprising a monomer having at least one first functional group able to thermally form covalent chemical bonds with the OH reaction sites and at least one second functional group differing from the first group and able to form covalent chemical bonds with said resin during its hardening under said radiation, the first group being selected from the group consisting of an isocyanate, a carboxylic acid anhydride, a methylol and a carboxylic acid chloride group;

(b) depositing on the fibers the solution obtained in step (a); and (c) heating the fibers obtained in step (b) at a temperature higher than ambient temperature and sufficient (i) to evaporate the solvent and (ii) trigger a chemical reaction between the first functional group of the monomer and each OH reaction site of the carbon fibers.

2. The process according to claim 1, and including the step of introducing into the solution obtained in step (a) a catalyst or a catalyst mixture to aid the chemical reaction of step (c).

3. The process according to claim 1, wherein the first group is an isocyanate group.

4. The process according to claim 1, wherein the second group is an ethylene unsaturation.

5. The process according to claim 1, wherein the second group is selected from the group consisting of a cinnamate, a maleate, a fumarate, a styrene, an acrylate, a methacrylate and a maleimide group.

6. The process according to claim 1, wherein the second group is selected from the group consisting of a methacrylate and a maleate group.

* * * * *